(12) United States Patent
Dowla et al.

(10) Patent No.: US 7,194,019 B2
(45) Date of Patent: Mar. 20, 2007

(54) MULTI-PULSE MULTI-DELAY (MPMD) MULTIPLE ACCESS MODULATION FOR UWB

(75) Inventors: Farid U. Dowla, Castro Valley, CA (US); Faranak Nekoogar, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 676 days.

(21) Appl. No.: 10/631,560

(22) Filed: Jul. 30, 2003

(65) Prior Publication Data

US 2004/0202230 A1 Oct. 14, 2004

Related U.S. Application Data

(60) Provisional application No. 60/462,507, filed on Apr. 11, 2003.

(51) Int. Cl.
*H04B 1/00* (2006.01)
(52) U.S. Cl. ........................ 375/147; 375/259; 375/141; 375/139
(58) Field of Classification Search ................ 375/147, 375/259
See application file for complete search history.

(56) References Cited

U.S. PATENT DOCUMENTS

| | | | |
|---|---|---|---|
| 5,952,956 A | 9/1999 | Fullerton | |
| 6,202,047 B1 * | 3/2001 | Ephraim et al. | 704/256.6 |
| 6,810,087 B2 * | 10/2004 | Hoctor et al. | 375/259 |
| 2001/0053175 A1 | 12/2001 | Hoctor et al. | |
| 2002/0034191 A1 | 3/2002 | Shattil | |
| 2002/0190786 A1 | 12/2002 | Yoon et al. | |
| 2003/0043931 A1 | 3/2003 | Fullerton et al. | |
| 2003/0069026 A1 | 4/2003 | Hoctor et al. | |

FOREIGN PATENT DOCUMENTS

| WO | WO 02/31986 A2 | 4/2002 |
|---|---|---|
| WO | WO 02/084969 A1 | 10/2002 |

OTHER PUBLICATIONS

Hoctor et al, Delay-Hopped Transmitted-Reference RF Communications, 2002 IEEE Conference on Ultra Wideband Systems and Technologies, pp. 265-269. GE Global Research, Niskayuna NY.
Choi et al, Performance of Autocorrelation Receivers for Ultra-Wideband Communications with PPM in Multipath Channels, Dept. of Electrical Engineering and Computer Science, pp. 213-218. Ann Arbor, MI 48109.

(Continued)

Primary Examiner—Temesghen Ghebretinsae
Assistant Examiner—Juan Alberto Torres
(74) Attorney, Agent, or Firm—Michael C. Staggs; John H. Lee

(57) ABSTRACT

A new modulation scheme in UWB communications is introduced. This modulation technique utilizes multiple orthogonal transmitted-reference pulses for UWB channelization. The proposed UWB receiver samples the second order statistical function at both zero and non-zero lags and matches the samples to stored second order statistical functions, thus sampling and matching the shape of second order statistical functions rather than just the shape of the received pulses.

37 Claims, 7 Drawing Sheets

OTHER PUBLICATIONS

Michael et al, Multiple Pulse Generator for Ultra-Wideband Communication using Hermite Polynomial Based Orthogonal Pulses, 2002 IEEE Conference on Ultra Wideband Systems and Technologies, pp. 47-51.

Khamy et al, Multi-User Chirp Modulation Signals (M-CM) for Efficient Multiple-Access Communication Systems. Proceedings of the Thirteenth National Radio Science Conference, Mar. 19-21, 1996, Cairo, Egypt.

* cited by examiner

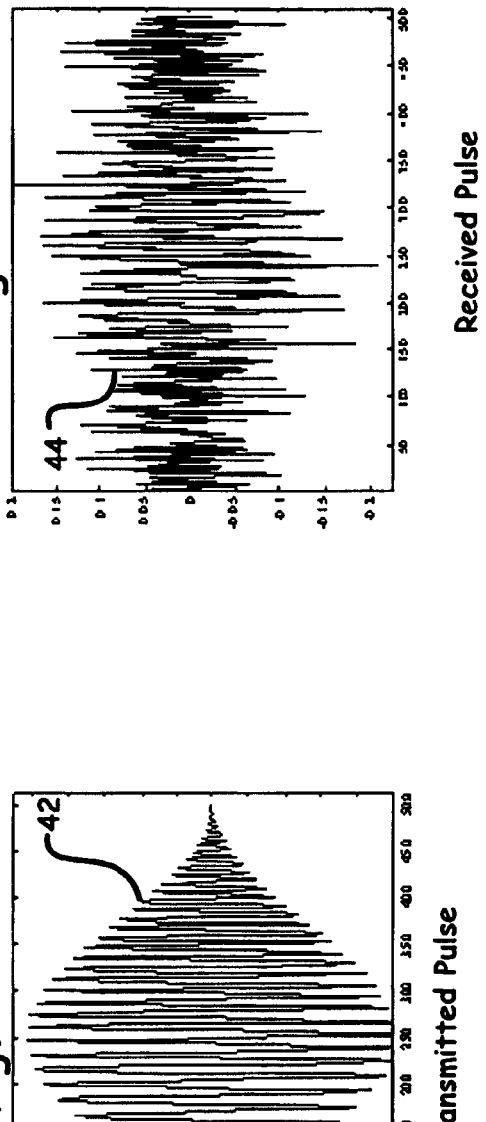
Fig. 2a
Fig. 2b
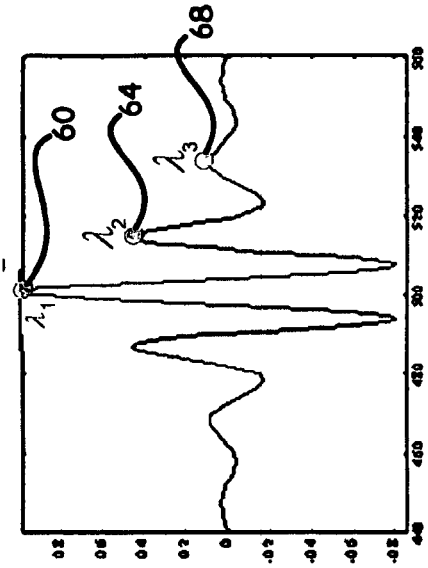
Fig. 2d
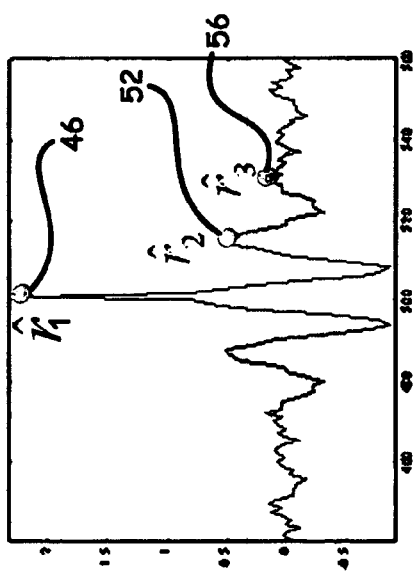
Fig. 2c

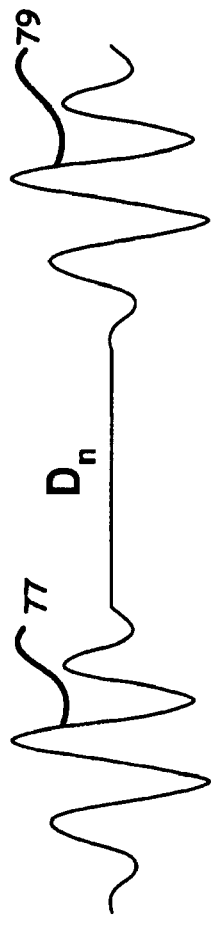
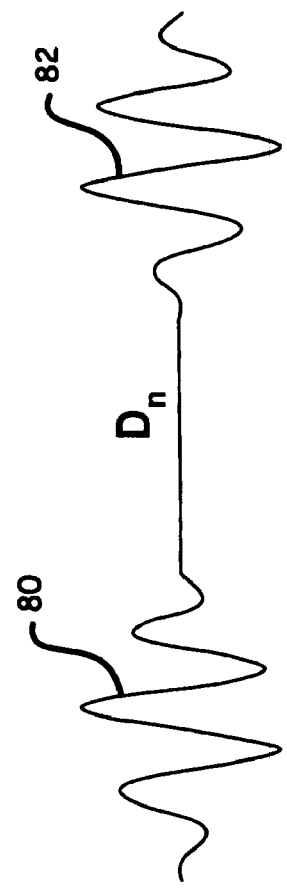
Fig. 4a
"Ref" and "Data" Pulses with the same polarity represents "1"
Fig. 4b
"Ref" and "Data" Pulses with the opposite polarity represents "1"

MULTI-PULSE MULTI-DELAY (MPMD) MULTIPLE ACCESS MODULATION FOR UWB

RELATED APPLICATION

This application claims the benefit of U.S. Provisional Application No. 60/462,507, filed Apr. 11, 2003, and entitled, "Multi-Pulse Multi-Delay (MPMD) Multiple Access Modulation for UWB," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a communication method, apparatus and system, and more particularly to an ultra wide-band (UWB) communication apparatus, system and method employing multiple pulses coupled with multiple delays.

2. Description of Related Art

In a multiple access UWB communications system, users transmit information independently and concurrently over a shared channel. The received signal is therefore a superposition of all user signals with added channel noise. There has been extensive research in separating multiple users in a multiple access UWB system using time division multiple access (TDMA) or code division multiple access (CDMA), Pulse Amplitude Modulation (PAM) and Pulse Position Modulation (PPM) techniques. PAM modulation encodes the data bits based on different levels of power (amplitude) in short duration pulses. In PPM modulation, signals are pseudo randomly encoded based on the position of transmitted pulse trains by shifting the pulses in a predefined window in time. PPM transmitted signals are usually demodulated and recovered with template matching at the receiver. The two main problems associated with these methods are the need for stringent synchronization and the increase in multiple access interference (MAI) as the number of channels increases.

A modulation technique called Transmitted-Reference (TR), characterized by the transmission of a pair of pulses separated by a unique delay to represent data bits, has been utilized to address synchronization problems. This technique sends the same pulse twice through an unknown channel where both pulses are similarly distorted so that the detection of the transmitted pulses becomes easier with an autocorrelation receiver without the synchronization challenges that exist in other conventional approaches. Although this technique has addressed the synchronization problem, the MAI concern still exists due to the fact that a single UWB pulse shape is used for all channels.

Such a multiple access modulation technique to address synchronization problems is described in U.S. Patent No. 2001/0053175, entitled "Ultra-Wideband Communications System," to Hoctor et al., patented Dec. 20, 2001, including the following: "[t]he present invention consists of the combination of two chief features and innovation surrounding each of them. The first of these is known in the art as transmitted-reference (TR). The TR technique is defined as the transmission of two versions of a wideband carrier, one modulated by data and the other unmodulated. The second feature of the present invention is a type of multiple access scheme called 'delay hopping'. The term 'delay hopping' refers to a multiple access technique that is related to delay modulation in the way that 'frequency hopping' is related to frequency modulation. Our new system has high immunity to narrow-band interference by virtue of both the delay-hopping (DH) feature and the use of more than two pulses in the TR transmission."

Conventional ultra wideband communication systems do not disclose a multiple pulse, multiple delay (MPMD), multiple access system that samples the zero and multiple non-zero lags of received autocorrelated pulses to produce optimal high performance channelization for multiple users.

Accordingly, a need exists for an ultra wideband communication channelization method and system for transmission and reception of multiple sampled autocorrelated ultra-wideband pulses in a multiple access communications format.

SUMMARY OF THE INVENTION

The present invention is directed to an ultra-wideband (UWB) receiver that is capable of correlating and multi-sampling received pulses over second order statistical values of received pulses to determine an output signal indicative of encoded information.

Another aspect of the present invention is directed to an ultra-wideband (UWB) receiver that is capable of correlating and multi-sampling received pulses over values of autocorrelation functions from received orthogonal chirp pulses that includes, a primary delay to reproduce a lag interval $D_n$ of a transmitted chirp pulse pair, one or more secondary delays to produce one or more non-zero lag intervals $d_{nk}$ of the received pulses, a plurality of pulse multipliers and pulse integrators, a bank of filters to match a plurality of stored sampled autocorrelation functions of one or more transmitted pulses with generated autocorrelation functions, and a hard decision block designed to produce one or more output bits based on matched sampled autocorrelation functions and generated autocorrelation functions of received pulses indicative of encoded transmitted information.

Another aspect of the present invention is directed to an ultra-wideband (UWB) system that is capable of correlating and multi-sampling received pulses over second order statistical values of received pulses to determine an output signal indicative of encoded information.

Another aspect of the present invention is directed to an ultra-wideband (UWB) system that is capable of correlating and multi-sampling received pulses over values of autocorrelation functions from received orthogonal chirp pulses that includes, a transmitter, a receiver, a plurality of pulse multipliers and pulse integrators, a bank of filters to match a plurality of stored sampled autocorrelation functions of transmitted pulses with generated autocorrelation functions, and a hard decision block designed to produce one or more output bits based on matched sampled autocorrelation functions and generated autocorrelation functions of received pulses indicative of encoded transmitted information.

Another aspect of the present invention is directed to an ultra-wideband (UWB) method that includes: estimating a plurality of values of a received signal's second order statistics, and matching said values to a transmitted signal's sampled second order statistical values.

A final aspect of the present invention is directed to an ultra-wideband (UWB) method of transmitting one or more pairs of chirp pulses separated by one or more predetermined lag intervals $D_n$, wherein the pulses are capable of being encoded by a relative polarity. After receiving the pulses, a primary delay for a received pulse by the transmitter reproduces the lag interval $D_n$ and one or more secondary delays produces one or more non-zero lag intervals $d_{nK}$. Multiplying circuitry receives the primary and secondary delayed pulses and a predetermined received reference pulse and integrating circuitry generates the output from the multiplying circuitry to generate a plurality of autocorrelation functions of the received pulses. After matching a plurality of stored sampled autocorrelation functions of the transmitted pulses with the generated autocorrelation functions, bit information based on the matched pre-sampled autocorrelation functions and the generated autocorrelation functions is output indicative of encoded information of the transmitted pulses.

Accordingly, the present system and method provides a desired UWB system and method capable of delivering a large amount of data with a low power spectral density by sampling the ACF of received signals and matching it to the ACF samples of the original pulses for each user. Such a system is more robust and has an increased channel capacity to allow a greater number of users to communicate, for example, in residential gateway and home networking markets.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 2a shows an example waveform of the transmitted chirp pulse.

FIG. 2b shows an example waveform of the received chirp pulse.

FIG. 2c shows an example waveform of a received signal's ACF.

FIG. 2d shows an example waveform of a transmitted signal's ACF.

FIG. 4a shows an MPMD symbol including two chirp pulses with the same polarity and separated by $D_n$ to represent a data bit "1".

FIG. 4b shows an MPMD symbol including two chirp pulses with the opposite polarity and separated by $D_n$ to represent a data bit "0".

DETAILED DESCRIPTION OF THE INVENTION

Figure 1:
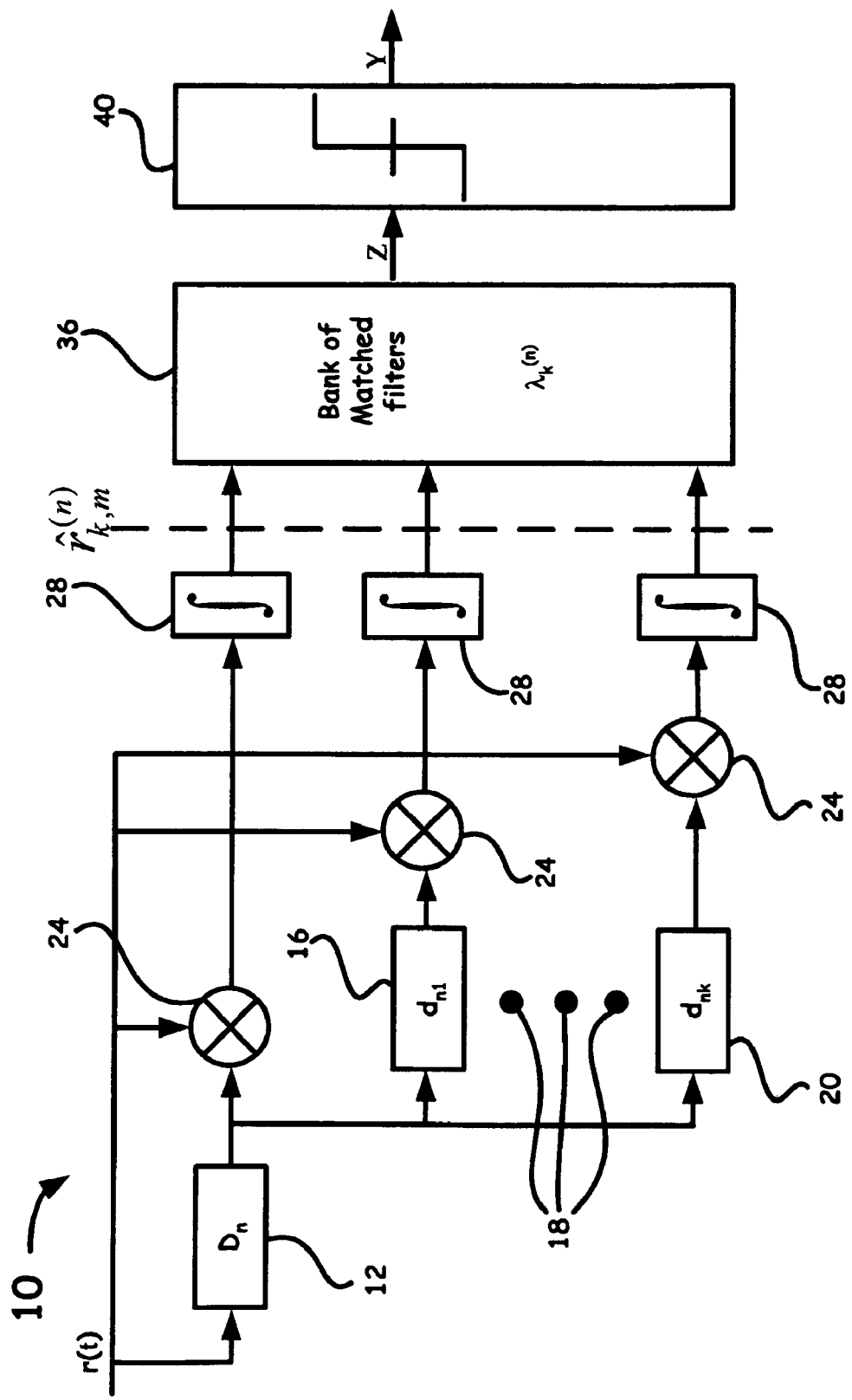
FIG. 1 is a general block diagram of a UWB receiver of the present invention.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

General Description

Conventional modulation techniques in multiple access UWB systems employ the same pulse shape and modulate the transmit pulse based on changing amplitude, position, or time separation between the pulses for each channel respectively. One concern with using the same pulse shape for all channels is that the multiple access interference (MAI) increases with the number of users. This is due to increased cross-correlation between similar pulses of multiple channels, thus raising the noise floor in such systems. The present invention provides a modulation/demodulation method and system based on TR modulation in a multiple access UWB communications format that improves the bit-error-rate performance and capacity (i.e., the number of channels of communication) of a TR-based UWB system.

The modulation technique of the present invention utilizes multiple orthogonal TR modulated chirp pulses for UWB channelization. Such chirp pulses are typically generated by conventional techniques, such as, voltage controlled oscillators (VCO). The pulses are just a sequence of impulses; there is no carrier. There is no specific frequency associated with this technique; rather, its frequency spectrum is related by, for example, the Fourier transform of the pulse. The free-space radiated pulse may have a pulse-width of about 5 ns or less, often about 1 ns or less, and more often about 200 picoseconds wide with average power levels of up to about 5 mW. In addition, other pulse shapes that provide orthogonality and decrease MAI and increase channel capacity, such as, for example, a wavelet based waveform, (i.e., a functional waveform that satisfies certain mathematical requirements to represent other functions), or a Hermite based waveform may also be employed.

The present invention combines orthogonal pulse shape coding and TR modulation to improve bit error rate (BER) performance, reduce MAI and increase channel capacity. The channel capacity is defined as the number of simultaneous channels, or the amount of data transferred in a communications system. The use of multiple uncorrelated pulses in the present invention alleviates the time delay restrictions that exist in original TR modulation schemes wherein a single pulse shape is used for all channels. In the MPMD method of the present invention, the time delays used to separate the channels can be as small as about a fraction of the pulse duration, e.g., down to about a picosecond, for each user to produce the improved BERs. Furthermore, the unique delay between the pulses for each user as well as the orthogonality of multiple pulses eliminates the need for stringent synchronization.

A symbol in the present invention is represented by a pair of chirp pulses (unique to each user) called a reference ("Ref") pulse and "Data" pulse separated by a unique delay for each user. An exemplary UWB receiver of the present invention can sample the receiver autocorrelation function (ACF) at both zero and non-zero lags, thus providing a multi-sampling method that matches the shape of the received ACFs rather than just the shape of the received pulses. Multi-sampling, i.e., sampling zero and non-zero ACF lags, is a beneficial approach when utilizing UWB pulses because of channel distortions, such as, noise, fading and multipath effects, (i.e., effects that result from the destructive interference caused by the sum of several received paths that may be out of phase with each other), which can make pulse detection difficult because the pulse shape at the receiver is typically different compared to the transmitted pulse shape. However, autocorrelation functions of these pulses preserve their shape at the receiver despite the deleterious effects of such channel distortions.

Accordingly, multi-sampling the ACF of received signals and matching it to the ACF samples of the original pulses for each user provides a more robust UWB communications system and method that increases channel capacity and enables more users to share the same spectrum with an improved bit error rate (BER) performance.

Specific Description

Turning now to the drawings, FIG. 1 shows an exemplary MPMD receiver block diagram of the present invention and is generally designated as reference numeral 10. As shown in FIG. 1, receiver 10 includes a user's delay, i.e., a main delay ($D_n$) 12, which represents the delay between "Ref" and "Data" pulses for each user, and a plurality of offset delays or lags ($d_{n1}$–$d_{nk}$), 16, 18, 20, of the original received signal, denoted as r(t). By utilizing such multiple delayed versions of received signal r(t) and multiplying and integrating by a plurality of multiplier 24 and integrating circuits 28 respectively, sampling of received signal's r(t) second order statistical shape, such as, for example, over an autocorrelation shape (and not on the signal shape), can be performed at multiple times. Next, as one embodiment, output signals from integrators 28 are matched by a bank of matched filters 36 to sampled values of autocorrelation functions (ACFs) of the original transmitted pulses. As another arrangement, matched filters 36 can store cross-correlation functions of received signal r(t), instead of stored ACFs of the original transmitted pulse(s), and match these stored cross-correlation functions to cross-correlation functions produced by similar circuitry of the present invention. The matched signals are then output, as denoted by the letter Z, to a hard decision block 40 that can output a signal Y indicative of the original encoded transmitted information.

The transmitted and received pulses of the present invention more often includes chirp pulses (i.e., a frequency modulated signal) with different start and end frequencies with each user having its own unique pulse shape. Chirp pulses that do not overlap in frequency band and are theoretically uncorrelated with each other (i.e., are orthogonal) can be separated using techniques of the present invention. However, other pulse formats, capable of providing uncorrelated pulse shapes, known by those skilled, in the art, which are suitable for UWB communications can additionally be employed within the design parameters of the present invention, such as, but not limited to, Hermite function based orthogonal pulses and wavelet waveforms.

A typical UWB pulse experiences significant degradations in dense multi-path channels but the shape of its second order statistical function, e.g., the autocorrelation function (ACF), is relatively preserved at the receiver. Therefore, multi-sampling the shape of the second order statistical function by MPMD receiver 10 provides significant improvements to the detection process of multiple pulse systems.

In the method of the invention, an example beneficial MPMD receiver 10 can multi-sample a second order statistical function, such as, an ACF of each user's pulse at both the zero and non-zero lags (i.e., ACF side lobes) and matches them to corresponding samples taken from known transmitted ACF pulse-shapes rather than sampling and matching signal pulse shapes. Such an example receiver 10 employs an autocorrelation technique by using multiple delayed versions of the received signal. It is significant to note that $D_n$ and $d_{nk}$ are unique for each receiver channel, i.e., each user. Then, matched filters 36 matched to ACF samples, denoted as $\lambda_k^{(n)}$ in FIG. 1, of transmitted pulses for each user followed by hard decision block 40 separates the channels. The output of receiver 10, as denoted by the letter Y in FIG. 1, is given by:

$$Y = \text{sgn}(\lambda_k^{(n)} \cdot \hat{r}_{k,m}^{(n)})$$

Here, the dot product represents matched filtering, n=1, 2, ... N (# of users), k=1, 2, ... K (# of lags), m=1, 2, ... M (# of bits), and where, $$\lambda_k^{(n)} = [R_{P_n P_n}^{(n)}(1) \ldots R_{P_n P_n}^{(n)}(K)]; \text{ and}$$

$$\hat{r}_{k,m}^{(n)} = \begin{bmatrix} \hat{r}_{1,1}^{(n)} & \cdots & \hat{r}_{1,m}^{(n)} \\ \vdots & \ddots & \vdots \\ \hat{r}_{k,1}^{(n)} & \cdots & \hat{r}_{k,m}^{(n)} \end{bmatrix};$$

wherein $\lambda_k^{(n)}$ denotes a vector of K sampled values of the $n^{th}$ user's transmitted pulses' normalized autocorrelation function. For example, $R_{P_n P_n}^{(n)}(1)$ represents the first sampling point (lag=0) of the normalized ACF for the $n^{th}$ user's transmitted pulse. Similarly, $\hat{r}_{k,m}^{(n)}$, shown as the output of integrators 28 in FIG. 1, provides the sampled ACF matrix of the $n^{th}$ user's $m^{th}$ bit for k lags at the receiver. Each row of the $\hat{r}_{k,m}^{(n)}$ matrix represents the correlation between the received signal and its delayed version based on various delays as shown by the following equation:

$$\hat{r}_{k,m}^{(n)} = \int_{(m-1)T}^{(m-1)T+T_{in}} r(t) \cdot r(t - \Delta_n) dt;$$

where $T_{in}$ is the integration time that is most effective at a pulse width and $\Delta_n$ is the total delay given by:

$$\Delta_n = D_n + d_{nk}.$$

As shown by the equation for $\Delta_n$, $D_n$ represents the $n^{th}$ user's main delay representing lag zero in the ACF and $d_{nk}$ denotes the offset from its main delay or lag k in the ACF and its value is zero for k=1 ($d_{n1}$=0).

Therefore, delaying the received signal by $D_n$ causes a "Ref" pulse to align with a "Data" pulse in each pulse pair where their product decodes the pulse pair by capturing the energy in lag zero of the generated ACF. Integrating this product over a finite time samples the ACF at lag zero. Further delaying the received signal by multiple offsets $d_{nk}$, which is added to the main delay $D_n$ and multiplying with its undelayed version, samples the ACF in non-zero lags after integration. The sampled points are estimates of the received signal's ACF. These values ($\hat{r}_{k,m}^{(n)}$) are then matched to the original pulses' sampled ACF values ($\lambda_k^{(n)}$) and provide a more accurate decoding of the received symbols.

FIG. 2a–d shows a set of example transmitted and received waveform signals to illustrate the value of matching over the second order statistical values, such as, by sampling over the shape of ACFs or cross-correlation functions, rather than sampling over the signal pulse shape as is conventionally performed in classical matched filters. FIG. 2a shows a transmitted chirp waveform pulse 42 with amplitude versus frequency shown by the Y and X-axis respectively. FIG. 2b shows a received pulse 44 after channel distortions by a conventional UWB communication system. FIG. 2c shows a received autocorrelation waveform using techniques of the present invention wherein $\hat{r}_1$ 46, $\hat{r}_2$ 52, and $\hat{r}_3$ 56 are example sampled points that provide the $\hat{r}_{k,m}^{(n)}$ matrix and which correspond, for example, to main delay ($D_n$) 12, and offset delays $d_{n1}$ 16 and $d_{nk}$ 20 respectively, as shown in FIG. 1. FIG. 2d shows an ACF of the transmitted waveform of chirp pulse 42, as shown in FIG. 2a, wherein $\lambda_1$ 60, $\lambda_2$ 64, and $\lambda_3$ 68 are sampled points from the ACF waveform of the transmitted pulse of that specific user to provide $\lambda_k^{(n)}$ i.e., bank of matched filters 36, as shown in FIG. 1.

Therefore, multi-sampling the ACF of received signals, as illustrated in FIG. 2c and matching such signals to the ACF samples of the original pulses, as shown in FIG. 2d, provides an improved performance because the shape of the ACF for each user's pulse is preserved at the receiver, while the received pulse shape from using conventional techniques, as shown in FIG. 2b, can be degraded significantly.

Figure 3B:
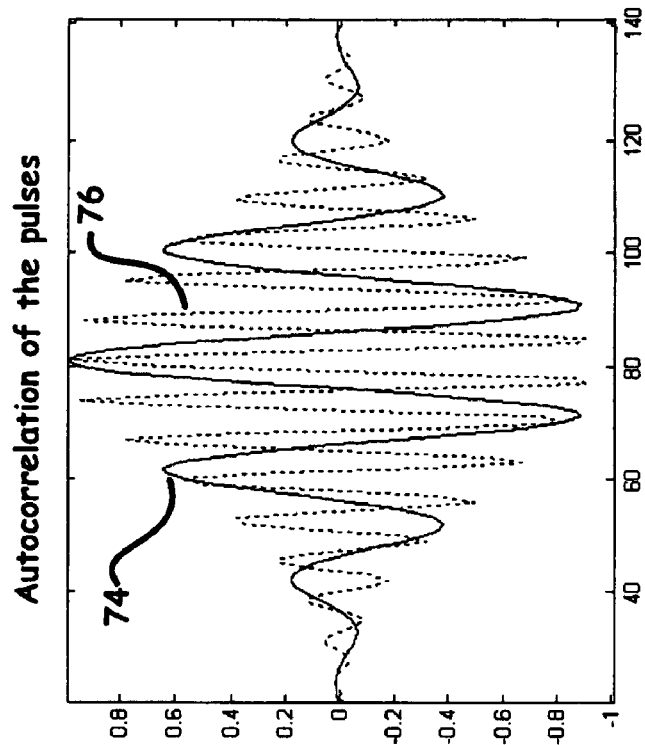
FIG. 3b shows the ACF of the orthogonal chirp transmission pulses of the present invention.
Figure 3A:
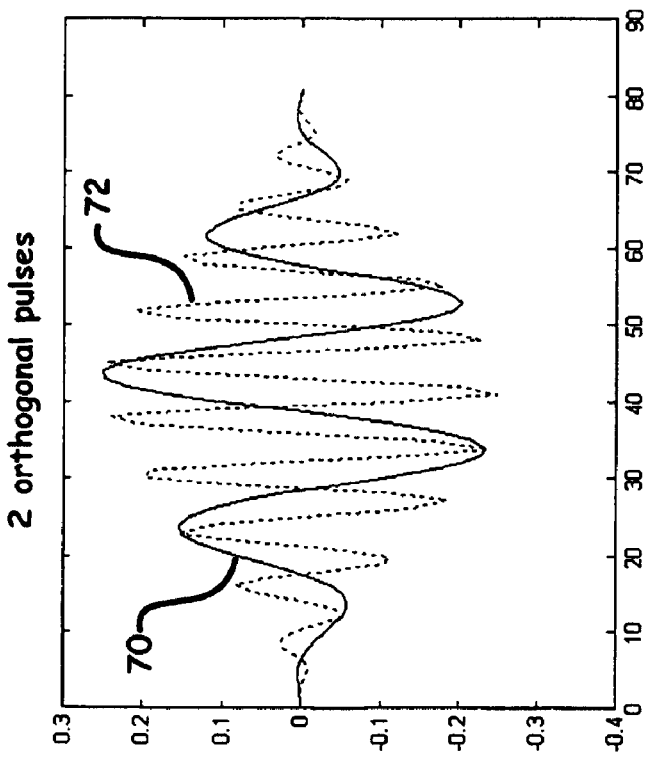
FIG. 3a shows orthogonal chirp transmission pulses of the present invention.

FIG. 3a shows a pair of transmitted orthogonal chirp pulses 70 (shown as a solid line) and 72 (shown as a dashed line) having a differing frequency modulation index and FIG. 3b illustrates the respective ACFs, i.e. ACF pulse 74 (shown as a solid line) corresponds to pulse 70 and ACF pulse 76 (shown as a dashed line) corresponds to pulse 72 as shown in FIG. 3a. Thus, FIG. 3a and FIG. 3b illustrate that multi-sampling the ACF enables pulse discrimination, which improves BER performance. In addition, the number of allowed users (i.e., channel capacity) is enlarged, which leads to an increase in bandwidth because only a minimal separation of transmitted pulses of down to about a picosecond is necessary.

FIG. 4a shows an example of a MPMD symbol representing a data bit "1", where a "Ref" 77 and a "Data" 79 pulse have the same polarity. FIG. 4b shows an example of a MPMD symbol representing a data bit "0", where a "Ref" 80 and a "Data" 82 pulse have opposite polarities.

Figure 5:
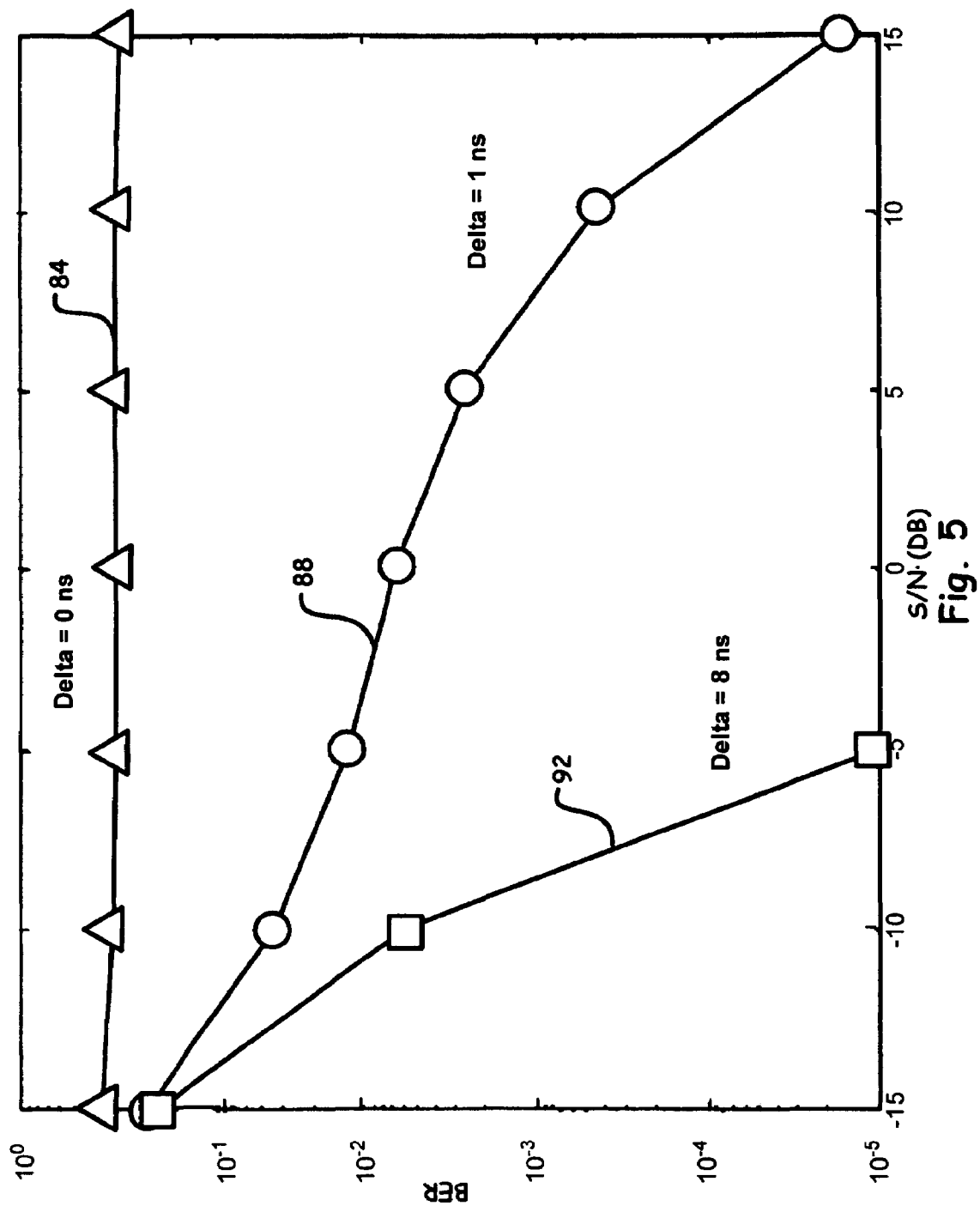
FIG. 5 shows Bit Error Rate data due to differing separation times between users' pulses.

FIG. 5 illustrates example data of a 10-user system showing different delay separations between users "Ref" and "Data" pulses, i.e., a Delta=$D_n$+$D_{n-1}$ while the number of ACF samplings points (lags) is kept constant at 1. The x-axis shows the Signal to Noise Ratio (SNR) in decibels (dB) that is an indication of the ratio of signal power to noise power. The y-axis is the BER, i.e., the percentage of bits that have errors relative to the total number of bits received in the transmission. Plots 84, 88, and 92 have Deltas of 0, 1 ns, and 8 ns, respectively. With a 1-ns 88 separation between the users pulse pairs, the achieved BER is $10^{-5}$ at 15 dB SNR. Increasing the delay between user's pulse pairs (Delta) to 8 ns 92 shows further improvement to achieve a BER of $10^{-5}$ at a much noisier environment of −5 dB SNR.

Figure 6:
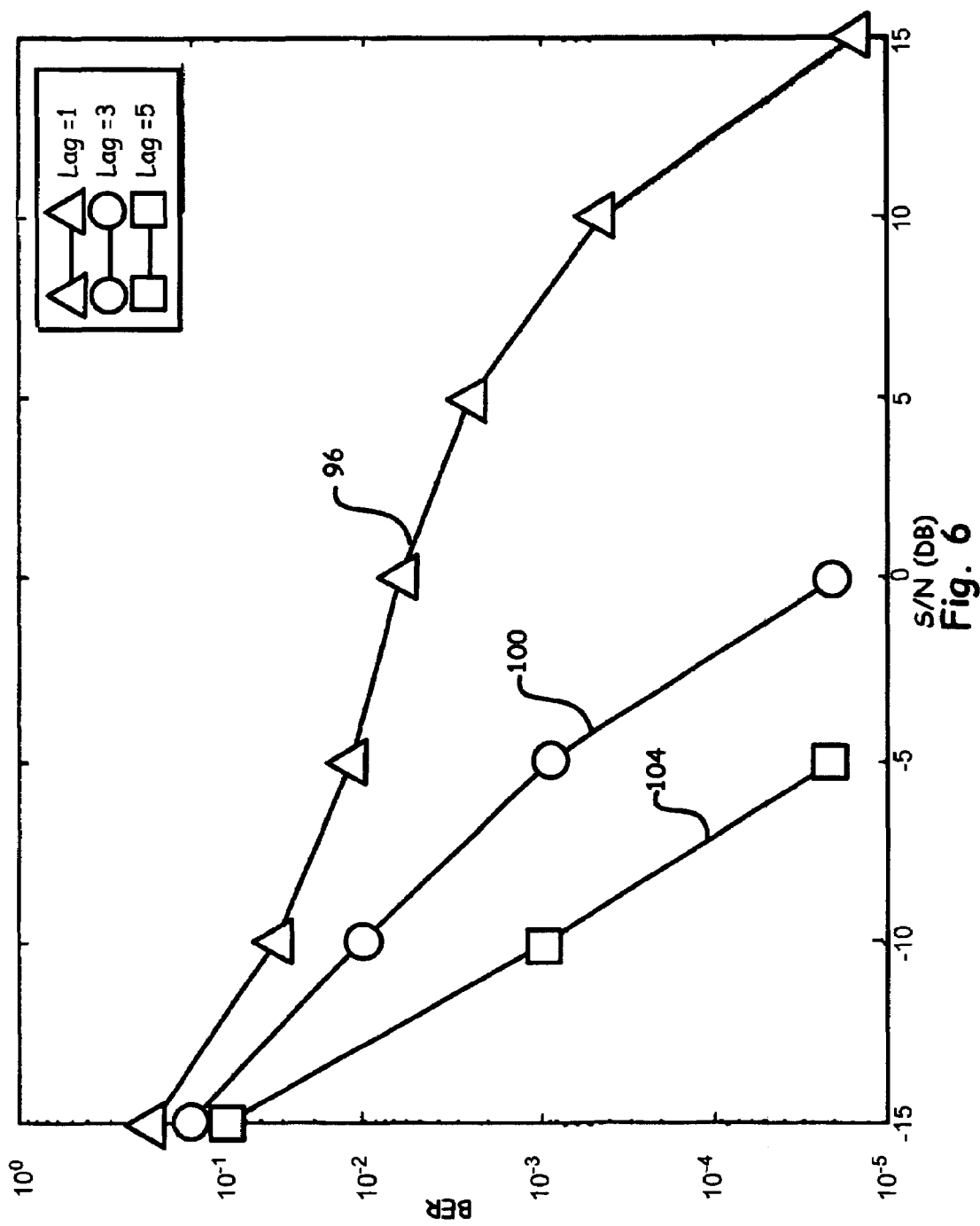
FIG. 6 shows Bit Error Rate performance data due to differing number of sampling points of the ACF.

FIG. 6 shows example data of a 10-user system having a 1-ns delay separation between each user's transmitted pulse pairs. FIG. 6 illustrates that with a minimal separation between the user's pulse pairs, and by increasing the ACF sampling points (i.e., lags), significant improvements in BER can be achieved. Plots 96 (which is the same as plot 88 in FIG. 5), 100, and 104 show data with a lag of 1, 3, and 5 respectively (i.e., a lag equals the number of sampling points of a pulse's ACF) and illustrates that as the number of lags increases, the BER performance improves. By keeping Delta constant and equal to 1 ns, sampling one point (e.g., the main lobe of ACF) provides a BER of $10^{-5}$ at 15 dB SNR as shown in FIG. 5. Increasing the number of sampling points in received signals ACF to 3 and 5, as shown by plots 100 and 104 respectively, offers a BER of $10^{-5}$ and much lower SNRs of 0 dB and −5 dB.

As stated hereinbefore, because the present invention matches to the shape of the ACF of transmitted and received pulses, the present invention is very effective in multipath environments. Specifically, since the same pulse in the present invention is sent twice through a channel where both pulses have undergone the same multipath distortion effects, the autocorrelation of the distorted "Ref" pulse and distorted "Data" pulse can still recover the transmitted signal.

Figure 7:
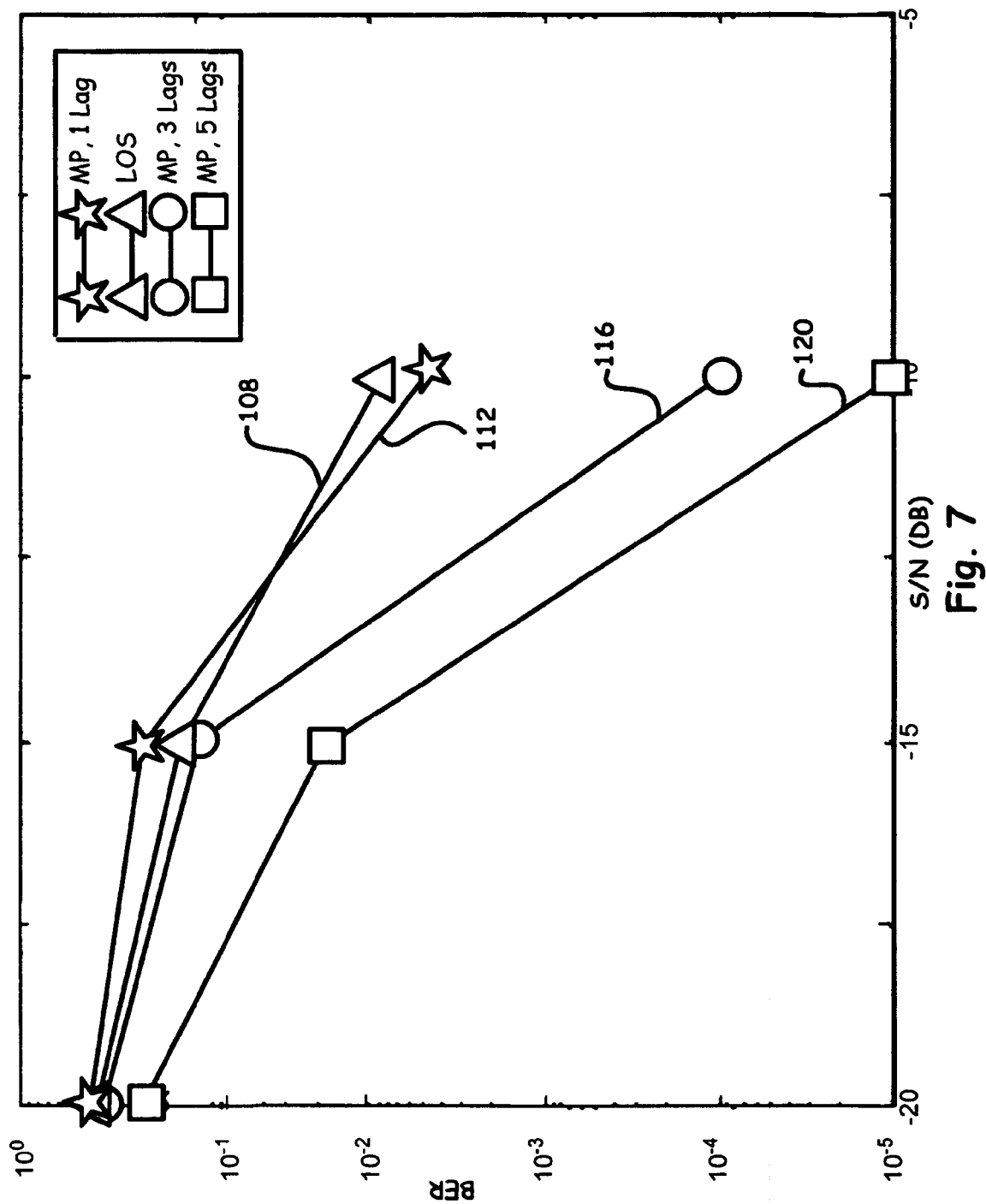
FIG. 7 shows Bit Error Rate performance for 2 users with a 1-ns separation between users and multiple ACF sampling points (K) at the presence of indoor wireless channels.

FIG. 7 represents the BER versus SNR for two users with a Delta=1 ns in a multipath channel. As shown in FIG. 7, the BER performance at K=1, i.e., 1 lag, 108 in a multipath case is close to a non-multipath, i.e., Line-of-Site (LOS) 112, case at lower signal to noise ratios. The multipath case, i.e., 3 lags 116 and 5 lags 120, outperforms the non-multipath case at higher SNRs since the "ref" and "data" pulses are correlated to each other, and the multipath channel introduces a longer duration in the signal component of the received signal, thus increasing the overall signal energy at the output of the integrator.

Accordingly, FIG. 7 shows a significant improvement in BER performance in a multipath channel when the number of ACF sampling points is increased. Specifically, the multipath components in the received signal contain significant energy and the ability to capture that energy by sampling multiple points in the received signals ACF is quite important in low-power UWB communications systems.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An ultra-wideband (UWB) receiver, capable of correlating and multi-sampling received pulses, comprising:
   a primary delay to reproduce a lag interval $D_n$ of a transmitted pulse pair; and
   one or more secondary delays to produce one or more non-zero lag intervals $d_{nk}$, wherein a plurality of second order statistical values of each of said received pulses produced at said primary and at said one or more secondary delays are matched to a plurality of second order statistical values of a predetermined reference pulse to determine an output signal indicative of encoded information.

2. The receiver of claim 1, where said second order statistical values are capable of being produced by an autocorrelation function.

3. The receiver of claim 1, where said second order statistical values are capable of being produced by a cross-correlation function.

4. The receiver of claim 1, wherein said encoded pulses includes orthogonal pulses.

5. The receiver of claim 4, wherein said orthogonal pulses include a chirp waveform.

6. The receiver of claim 5, wherein said chirp waveform is different for a plurality of users.

7. The receiver of claim 6, wherein said chirp waveform increases channel capacity and decreases multiple access interference (MAI).

8. The receiver of claim 4, wherein said orthogonal pulses include a Hermite waveform.

9. The receiver of claim 4, wherein said orthogonal pulses include a wavelet waveform.

10. The receiver of claim 1, wherein said encoding includes a relative polarity with respect to a transmitted reference pulse.

11. The receiver of claim 1, wherein said lag interval $d_{nK}$ includes a temporal delay that can be down to about a picosecond.

12. The receiver of claim 3, wherein cross-correlation values of said received pulses produced at said primary and at said one or more secondary delays are matched to cross-correlation values of a predetermined received sampled reference pulse to determine an output signal indicative of encoded information.

13. An ultra-wideband (UWB) receiver, capable of correlating and multi-sampling received chirp pulses, comprising:
a primary delay to reproduce a lag interval $D_n$ of a transmitted chirp pulse pair,
one or more secondary delays to produce one or more non-zero lag intervals $d_{nk}$ of said received pulses,
a plurality of pulse multipliers and pulse integrators designed to generate a plurality of autocorrelation functions of said received pulses at said primary delay and at said one or more secondary delays,
a bank of filters to match a plurality of stored sampled autocorrelation functions of one or more transmitted chirp pulses with said generated autocorrelation functions at said primary and said one or more secondary delays of said received chirp pulses; and
a hard decision block designed to produce one or more output bits based on said matched sampled autocorrelation functions and said generated autocorrelation functions of said received pulses indicative of encoded information of said transmitted pulses.

14. The system of claim 13, wherein said lag interval $d_{nK}$ includes a temporal delay that can be down to about a picosecond.

15. The system of claim 13, wherein said plurality of pulse multipliers and pulse integrators are designed to generate said cross-correlation functions of said received pulses at a zero-lag interval produced by said primary delay and at said one or more non-zero lag intervals $d_{nk}$ produced by said secondary delays, said bank of filters are designed to match said cross-correlation functions of said received pulses at said zero and non-zero lag intervals of said received pulses; and wherein said hard decision block is designed to produce one or more output bits based on matched cross-correlation functions indicative of encoded information of said generated pulses.

16. The system of claim 13, wherein said chirp pulses is different for a plurality of users.

17. The system of claim 13, wherein said chirp pulses increases channel capacity and decreases MAI.

18. An ultra-wideband (UWB) system, comprising: a transmitter capable of generating one or more encoded pulses separated by one or more predetermined lag intervals $D_n$; and
a receiver, capable of correlating and multi-sampling received pulses by including a primary delay to reproduce said lag interval $D_n$ and further including one or more secondary delays to produce one or more non-zero lag intervals $d_{nk}$, wherein a plurality of second order statistical values of each of said received pulses produced at said primary and at said one or more secondary delays are matched to a plurality of second order statistical values of a predetermined reference pulse to determine an output signal indicative of encoded information.

19. The system of claim 18, where said second order statistical values are capable of being produced by an autocorrelation function.

20. The system of claim 18, where said second order statistical values are capable of being produced by a cross-correlation function.

21. The system of claim 18, wherein said encoded pulses includes orthogonal pulses.

22. The system of claim 21, wherein said orthogonal pulses include a chirp waveform.

23. The system of claim 22, wherein said chirp waveform is different for a plurality of users.

24. The system of claim 23, wherein said chirp waveform increases channel capacity and decreases MAI.

25. The system of claim 21, wherein said orthogonal pulses include a Hermite waveform.

26. The system of claim 21, wherein said orthogonal pulses include a wavelet waveform.

27. The system of claim 18, wherein said encoding includes a relative polarity with respect to a transmitted reference pulse.

28. The system of claim 18, wherein said lag interval $d_{nK}$ includes a temporal delay that can be down to about a picosecond.

29. The system of claim 20, wherein cross-correlation values of said received pulses produced at said primary and at said one or more secondary delays are matched to cross-correlation values of a predetermined received sampled reference pulse to determine an output signal indicative of encoded information.

30. An ultra-wideband (UWB) system, comprising:
a transmitter capable of generating one or more chirp pulses separated by one or more predetermined lag intervals $D_n$, wherein said pulses are capable of being encoded by a relative polarity,
a receiver, further comprising,
a primary delay for delaying a received pulse by said transmitter to reproduce said lag interval $D_n$,
one or more secondary delays to produce one or more non-zero lag intervals $d_{nk}$ of said received pulses,
a plurality of pulse multipliers and pulse integrators designed to generate a plurality of autocorrelation functions of said received pulses at said primary delay and at said one or more secondary delays,
a bank of filters to match a plurality of stored sampled autocorrelation functions of said transmitted pulses with said generated autocorrelation functions at said primary and said one or more secondary delays of said received pulses; and a hard decision block designed to produce one or more output bits based on said matched sampled autocorrelation functions and said generated autocorrelation functions of said received pulses indicative of encoded information of said transmitted pulses.

31. An ultra-wideband (UWB) method, comprising:

transmitting one or more chirp pulses separated by one or more predetermined lag intervals $D_n$, wherein said pulses are capable of being encoded by a relative polarity, receiving said pulses, wherein a primary delay for a received pulse by said transmitter reproduces said lag interval $D_n$, and wherein one or more secondary delays produces one or more non-zero lag intervals $d_{nk}$ of said received pulses, multiplying and integrating said primary and secondary delayed pulses with a predetermined received reference pulse to generate a plurality of autocorrelation functions of said received pulses, matching a plurality of stored sampled autocorrelation functions of said transmitted pulses with said generated autocorrelation functions; and outputting bit information based on said matched pre-sampled autocorrelation functions and said generated autocorrelation functions indicative of encoded information of said transmitted pulses.

32. The method of claim 31, wherein said received pulses include orthogonal pulses.

33. The method of claim 32, wherein said orthogonal pulses include a chirp waveform.

34. The method of claim 33, wherein said chirp waveform is different for a plurality of users.

35. The method of claim 33, wherein said chirp waveform increases channel capacity and decreases MAI.

36. The method of claim 32, wherein said orthogonal pulses include a Hermite waveform.

37. The method of claim 32, wherein said orthogonal pulses include a wavelet waveform.

* * * * *